July 3, 1956
P. R. SMITH
2,752,692
LEVELING GAUGE
Filed May 13, 1955
2 Sheets-Sheet 1
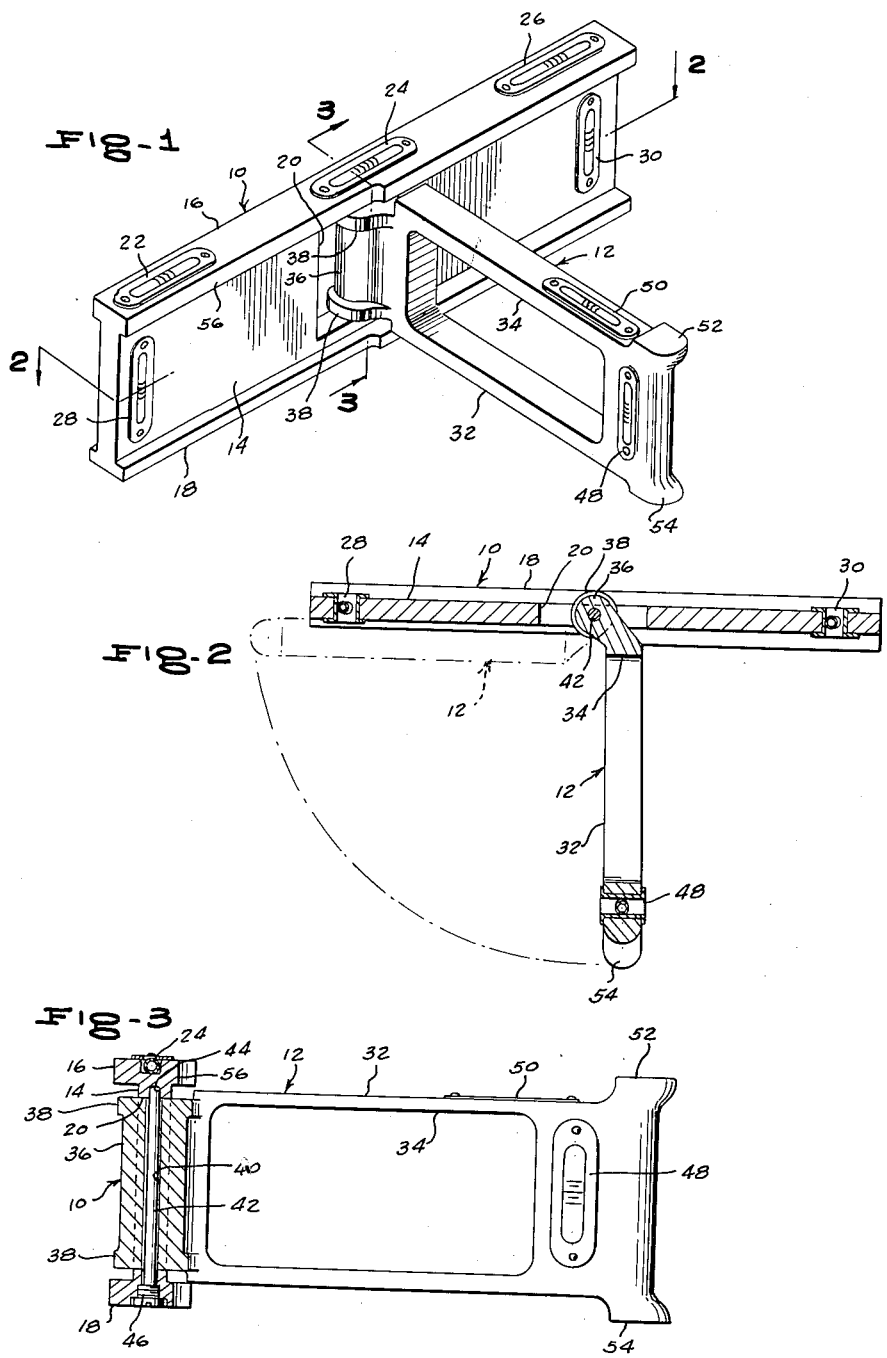
INVENTOR.
PRYOR R. SMITH
BY
McMorrow, Berman + Davidson
ATTORNEYS July 3, 1956  P. R. SMITH  2,752,692
LEVELING GAUGE
Filed May 13, 1955
2 Sheets-Sheet 2
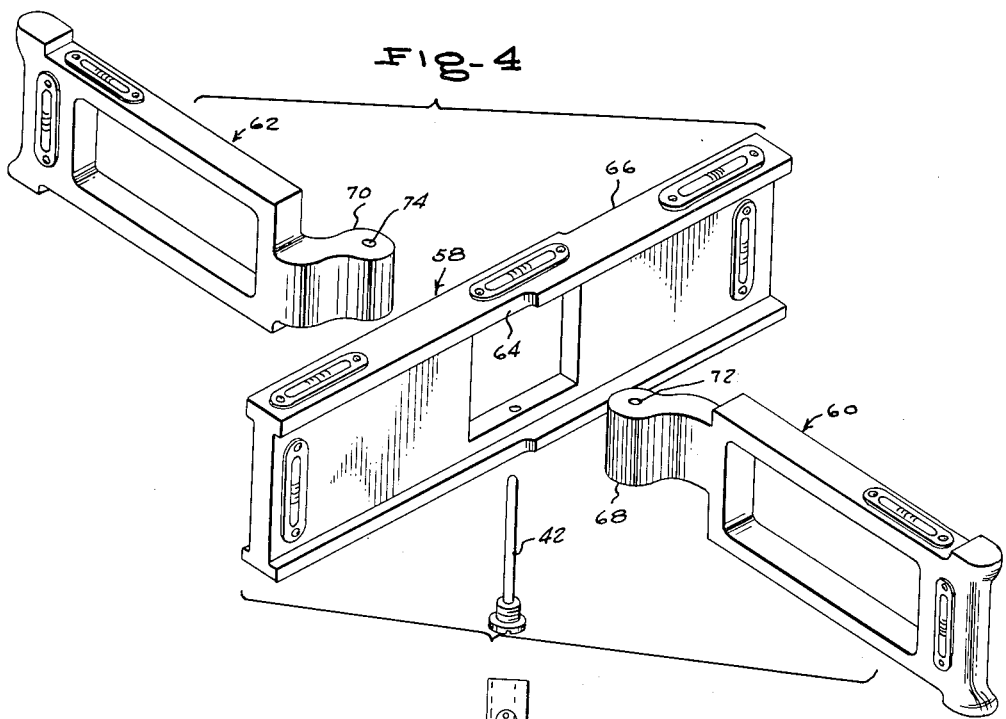
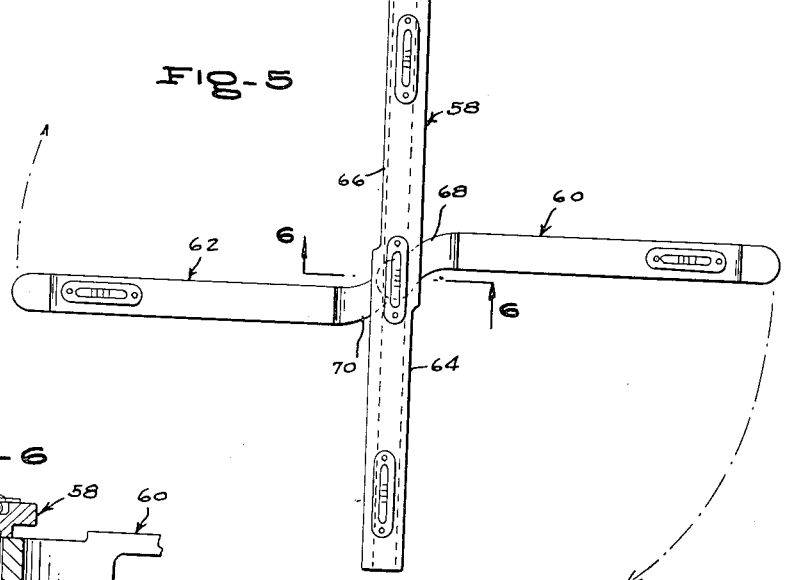
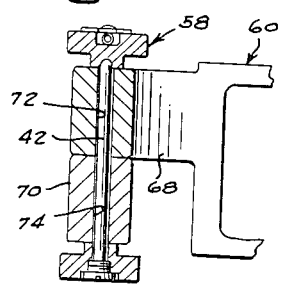
INVENTOR.
PRYOR R. SMITH
BY
McMorrow, Berman & Davidson
ATTORNEYS

United States Patent Office 2,752,692
Patented July 3, 1956

2,752,692
LEVELING GAUGE
Pryor R. Smith, Louisville, Ky.

Application May 13, 1955, Serial No. 508,061

3 Claims. (Cl. 33—208)

This invention relates to a leveling gauge which, summarized briefly, includes a main frame, and at least one arm pivotally connected to the main frame to swing outwardly therefrom, the arm and the main frame having coplanar, work engaging surfaces.

The purpose of a level of this type is to check the level of the work in a plurality of directions, so as to increase the overall area of the work that can be checked at one time. The most common form of level is the straight, relatively narrow, elongated level, and this, of course, in actuality checks only that area of the work in contact therewith. Since said area is relatively small, in view of the conformation and size of a conventional level, any irregularities in the surface area of the work at other, adjacent locations cannot be observed unless the level is moved to a plurality of different locations. And, even under these circumstances, an accurate observation cannot be made, since in many instances an irregularity in one portion of the work surface area may not be detected unless the gauge is, at the same time, in contact with another portion of said surface area. In other words, each of the two, adjacent areas, may be, per se, level, but they may not be level with one another and their relative offsetting from a common plane is not, accordingly, detectable when the level is first placed against one of said areas and then against the other area.

The broad object of the present invention is to provide a level which will eliminate the above noted deficiencies observed in conventional leveling tools.

A more specific object of the invention is to provide a level as described which can be used both as a conventional, elongated, relatively narrow leveling tool, or as a leveling gauge adapted to check the horizontality or verticality, as the case may be, of a greater surface area than can be checked by a conventional leveling tool. In this way, the tool is adapted for checking a surface area on, for example, an elongated, relatively narrow member such as a two-by-four length of lumber, the level in this instance being used with the arm or arms thereof folded against the main frame of the level. In a second instance the level can be used with its arm or arms swung outwardly, for checking a greater surface area, such as that on a flat, wide piece of plywood.

Still another more specific object is to provide a level as described in which the arm or arms, when swung outwardly from the main frame of the level, can be disposed in selected angular relationships to the general plane of the main frame, and can, in fact, be swung slowly from a position against the main frame to a position perfectly normal to the length of the main frame, with the idea in mind of checking for irregularities the entire work surface traversed by the arm during its swinging movement.

Another object is to provide a level as stated which, in one form of the invention, has a pair of arms, connected to the main frame for swinging movement about a common axis, and projecting in opposite directions from the main frame, with said arms being swingable independently of one another so as to permit the selective use of either or both of the arms, for checking work surface areas at opposite sides of the bottom surface of the main frame.

Other objects will appear from the following description, the claims appended thereto, and from the annexed drawing, in which like reference characters designate like parts throughout the several views, and wherein:

Figure 1 is a perspective view of a level formed according to the present invention with its arm extended;

Figure 2 is a sectional view on line 2—2 of Figure 1, the dotted line showing the arm in its inner, inoperative position;

Figure 3 is an enlarged sectional view on line 3—3 of Figure 1;

Figure 4 is an exploded perspective view of a modified form;

Figure 5 is a top plan view of the form of Figure 4; and

Figure 6 is an enlarged sectional view on line 6—6 of Figure 5.

The reference numeral 10, in Figures 1–3, designates the main frame of a level formed according to the present invention. At 12 there has been generally designated an arm, swingable between the full and dotted line positions of Figure 2 upon the main frame.

The main frame is preferably of extruded aluminum or the like, and in the illustrated embodiment is of I-shaped cross section, including a flat web 14 integral along its top and bottom edges with top and bottom flanges 16, 18, lying in parallel planes normal to the plane of the web.

Formed in the web medially between opposite ends thereof is a rectangular center opening 20, said opening being of substantial size and having its top and bottom edges in closely spaced relation to the top and bottom flanges respectively.

At opposite ends of the top flange, and at a location medially between the ends of the top flange, there are mounted therein spirit levels 22, 24, 26 longitudinally aligned with one another with their lengths extending within the plane of the web. The bottom flange 18 has a flat, work engaging bottom surface, and the levels are disposed with their lengths paralleling the lengths of said bottom surface.

Mounted in the web, at opposite ends thereof, are levels 28, 30, the lengths of which are perpendicular to the plane of and to the length of the work engaging bottom surface of the bottom flange.

Arm 12 includes an elongated, flat body 32 formed as an aluminum casting or the like, and preferably having, over substantially its full area, a large opening 34 to save material and increase the lightness of the arm.

At its inner end, the body 32 is integral with an angular extension 36 of the arm, and integrally formed upon the top and bottom ends of said extension are enlargements 38. The extension projects into the opening 20, with its top and bottom surfaces, as shown in Figure 3, in engagement with the top and bottom edges of the opening.

Formed in extension 36 is a bore 40, receiving a pivot pin 42, the inner end of which engages in a recess 44 aligned with bore 40. The outer end of the pivot pin has an enlarged, threaded portion 46 engaging complementary threads provided in a counterbore of the main frame.

At its outer end, the arm 12 has mounted therein spirit levels 48, 50. Level 48 has its length normal to that of the level 50, with the level 50 having its length aligned with the length of the arm, the level 50 thus extending approximately radially of the pivot axis of the arm.

On the outer extremity of the arm 12, there are formed upwardly and downwardly projecting enlargements 52, 54. The enlargement 54 has a flat bottom surface adapted to engage the work, and coplanar with the bottom surface of flange 18.

In use of the level, the arm may be swung into longitudinal contact with the main frame 10, and in this position, shown in dotted lines in Figure 2, the arm seats in an elongated recess 56 cut in the adjacent longitudinal edge of the top flange 16, and in a similar recess cut in the side of the bottom flange. With the arm collapsed against the main frame, the level is used in the manner of a conventional, relatively narrow level, this being desirable when the surface area of a relatively narrow length of material is being checked with the tool.

The arm can be swung to any one of a plurality of second positions in which it is angularly related to the length of the main frame, and in each of these positions, the length of the level 50 will be extended approximately radially of the pivot axis of the arm.

By reason of this arrangement, the arm can be swung outwardly into approximately perpendicular relation to the length of the main frame, to check a surface area of substantial width. Further, irregularities at any location over the width of said surface area can be readily checked, by slowly swinging the arm between its first and second positions shown in Figure 2. This is desirable since when an irregularity is encountered, the arm will be lifted or will, alternatively, drop on passing over said irregularity, and the irregularity will be immediately observed in the level 50, since the bubble will move along the length of the level 50. The irregularity will also be apparent from the levels 22, 24, 26 but perhaps to a lesser extent, since the bubbles in these levels will move transversely of their associated tubes.

The same characteristics, of course, are obtained when the work surface is being checked for verticality, and in this instance, the levels 28, 30, 48 will be used.

Due to the provision of the angular extension, the arm can, in fact, be extended not only to the full line position of Figure 2, but beyond said position to a substantial extent, thus increasing even more the area of the work that can be checked.

In the form of the invention shown in Figure 4-6, the basic construction is similar to that of the first form, except for the fact that two arms are used instead of one. In this form of the invention, the main frame has been generally designated 58, and pivotally mounted thereon are arms 60, 62.

In the opposite sides of the top and bottom flanges of the main frame, elongated recesses 64, 66 are formed, offset longitudinally of the main frame, to receive the arms 60, 62 respectively in the collapsed positions thereof.

Formed on arm 60 is an angular extension 68, while an angular extension 70, projecting in an opposite direction, is formed on arm 62. The extensions, as distinguished from the angular extension of the first form, are relatively low in height, and are offset in a vertical direction, viewing the same as in Figures 4 and 6. In the extensions, there are formed bores 72, 74, aligning with one another when the extensions are overlapped within the opening of the main frame, to receive the hinge pin 42.

In this form of the invention, both arms can be collapsed against opposite sides of the main frame to permit use of the level in the manner of a conventional, relatively narrow leveling tool. Alternatively, the arms can be swung outwardly independently of one another to selected angular positions in respect to the main frame, with their work engaging bottom surfaces still being coplanar with the bottom surface of the main frame. Therefore, surface areas on both sides of the bottom surface of the main frame can be readily checked, or on one side only if desired. Again, the arms can be slowly swung independently of one another to check the work surface area progressively, in a direction outwardly from the plane of the main frame.

It will be understood that all parts not specifically described and numbered in Figures 4-6 will be identical to corresponding parts of the first form of the invention.

It is believed apparent that the invention is not necessarily confied to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A leveling gauge comprising: an elongated main frame of I-shaped cross section including a flat web and top and bottom flanges lying in planes normal to that of the web, the bottom flange having a flat, work engaging bottom surface; levels carried by said main frame in predetermined positions in respect to said bottom surface, said web having an opening; and first and second arms respectively having work engaging bottom surfaces coplanar with the first named bottom surface, said arms being pivotally connected to the main frame for swinging movement about a common axis perpendicular to the common plane of said bottom surfaces, said arms projecting in opposite directions from the plane of said web and being swingable about said axis independently of one another between first positions in which they lie adjacent to and are in parallelism with the length of the main frame, and second positions in which the arms are related at a selected angle to the length of the main frame.

2. A leveling gauge comprising: an elongated main frame of I-shaped cross section including a flat web and top and bottom flanges lying in planes normal to that of the web, the bottom flange having a flat, work engaging bottom surface, said web having medially between its ends an opening communicating between opposite faces of the web and extending for substantially the full height of the web; a plurality of levels carried by said main frame and including at least one level extending in parallelism with the plane of the bottom surface with its length paralleling the length of the bottom surface; a pair of arms respectively having flat bottom surfaces coplanar with the first named bottom surface, said arms including angular extensions at one end thereof projecting into said opening and overlapping within the opening, said extensions having contacting inner faces and having outer faces in contact with the top and bottom edges of said opening, the extensions being pivotally connected to said web within the opening for swinging movement about a common axis perpendicular to the plane of the first named bottom surface; and a plurality of levels carried by each of said arms, at least one level of each arm extending approximately radially of said pivot axis in a plane paralleling the common plane of said bottom surfaces, and at least one other level of each arm having its length perpendicular to said common plane of the bottom surfaces, said arms projecting in opposite directions from the plane of the web and being swingable independently of one another between first positions in which they lie adjacent to and are in parallelism with the main frame, and second positions in which they are related at a selected angle to said main frame.

3. A leveling gauge comprising: an elongated main frame of I-shaped cross section including a flat web and top and bottom flanges lying in planes normal to that of the web, the bottom flange having a flat, work engaging bottom surface, said web having medially between its ends an opening communicating between opposite faces of the web and extending for substantially the full height of the web; a plurality of levels carried by said main frame and including at least one level extending in parallelism with the plane of the bottom surface with its length paralleling the length of the bottom surface; a pair of arms respectively having flat bottom surfaces coplanar with the first named bottom surface, said arms including angular extensions at one end thereof projecting into said opening and overlapping within the opening, said extensions having contacting inner faces and having outer faces in contact with the top and bottom edges of said opening, the extensions being pivotally connected to said web within the opening for swinging movement about a common axis perpendicular to the plane of the first named bottom surface; and a plurality of levels carried by each of said arms, at least one level of each arm extending approximately radially of said pivot axis in a plane paralleling the common plane of said bottom surfaces, and at least one other level of each arm having its length perpendicular to said common plane of the bottom surfaces, said arms projecting in opposite directions from the plane of the web and being swingable independently of one another between first positions in which they lie adjacent to and are in parallelism with the main frame, and second positions in which they are related at a selected angle to said main frame, said top and bottom flanges having elongated recesses formed in the opposite longitudinal edges thereof receiving the arms in the first positions thereof.

References Cited in the file of this patent

UNITED STATES PATENTS

| | | |
|---|---|---|
| 49,675 | Chase | Aug. 29, 1865 |
| 591,139 | Morton | Oct. 5, 1897 |
| 1,210,370 | Dvorak | Dec. 26, 1916 |
| 1,670,432 | Baldon | May 22, 1928 |